(12) United States Patent
Gaucher et al.

(10) Patent No.: US 11,097,692 B2
(45) Date of Patent: Aug. 24, 2021

(54) ADAPTER FOR CONNECTING A WIPER BLADE TO A DRIVE ARM

(71) Applicant: Valeo Systèmes d'Essuyage, Le Mesnil Saint Denis (FR)

(72) Inventors: Vincent Gaucher, Issoire (FR); Stéphane Houssat, Issoire (FR); Qibin Wang, Shanghai (CN)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 143 days.

(21) Appl. No.: 16/069,698

(22) PCT Filed: Jan. 6, 2017

(86) PCT No.: PCT/EP2017/050266
§ 371 (c)(1),
(2) Date: Jul. 12, 2018

(87) PCT Pub. No.: WO2017/121687
PCT Pub. Date: Jul. 20, 2017

(65) Prior Publication Data
US 2019/0016309 A1    Jan. 17, 2019

(30) Foreign Application Priority Data

Jan. 13, 2016   (FR) ...................................... 1650255

(51) Int. Cl.
*B60S 1/40* (2006.01)
*B60S 1/38* (2006.01)

(52) U.S. Cl.
CPC ........... *B60S 1/4019* (2013.01); *B60S 1/3858* (2013.01); *B60S 1/4009* (2013.01); *B60S 2001/4012* (2013.01)

(58) Field of Classification Search
CPC ........ B60S 1/40; B60S 1/4006; B60S 1/4009; B60S 1/4045; B60S 2001/4012; B60S 1/4019; B60S 1/3858
USPC .............................. 15/250.32; D12/219, 220
See application file for complete search history.

(56) References Cited

U.S. PATENT DOCUMENTS

2002/0174505 A1* 11/2002 Kim ......................... B60S 1/40
                                                        15/250.32
2009/0293218 A1   12/2009 Fujiwara et al.

FOREIGN PATENT DOCUMENTS

FR    2 957 877 A1    9/2011
JP    2001-354120 A   12/2001

OTHER PUBLICATIONS

International Search Report issued in PCT/EP2017/050266 dated Apr. 3, 2017 (2 pages).
Written Opinion of the International Searching Authority issued in PCT/EP2017/050266 dated Apr. 3, 2017 (4 pages).

* cited by examiner

*Primary Examiner* — Gary K. Graham
(74) *Attorney, Agent, or Firm* — Osha Bergman Watanabe & Burton LLP

(57) ABSTRACT

An adapter (112) for connecting a wiper blade to a drive arm, the adapter comprising two substantially parallel walls (28) connected together by at least one connecting element (30), said walls comprising first inner side faces (28a) between which said at least one connecting element extends, and outer side faces (28b) comprising protruding sliding guide patterns (132), characterised in that said patterns are divided into lines and columns.

15 Claims, 3 Drawing Sheets

Figure 1:
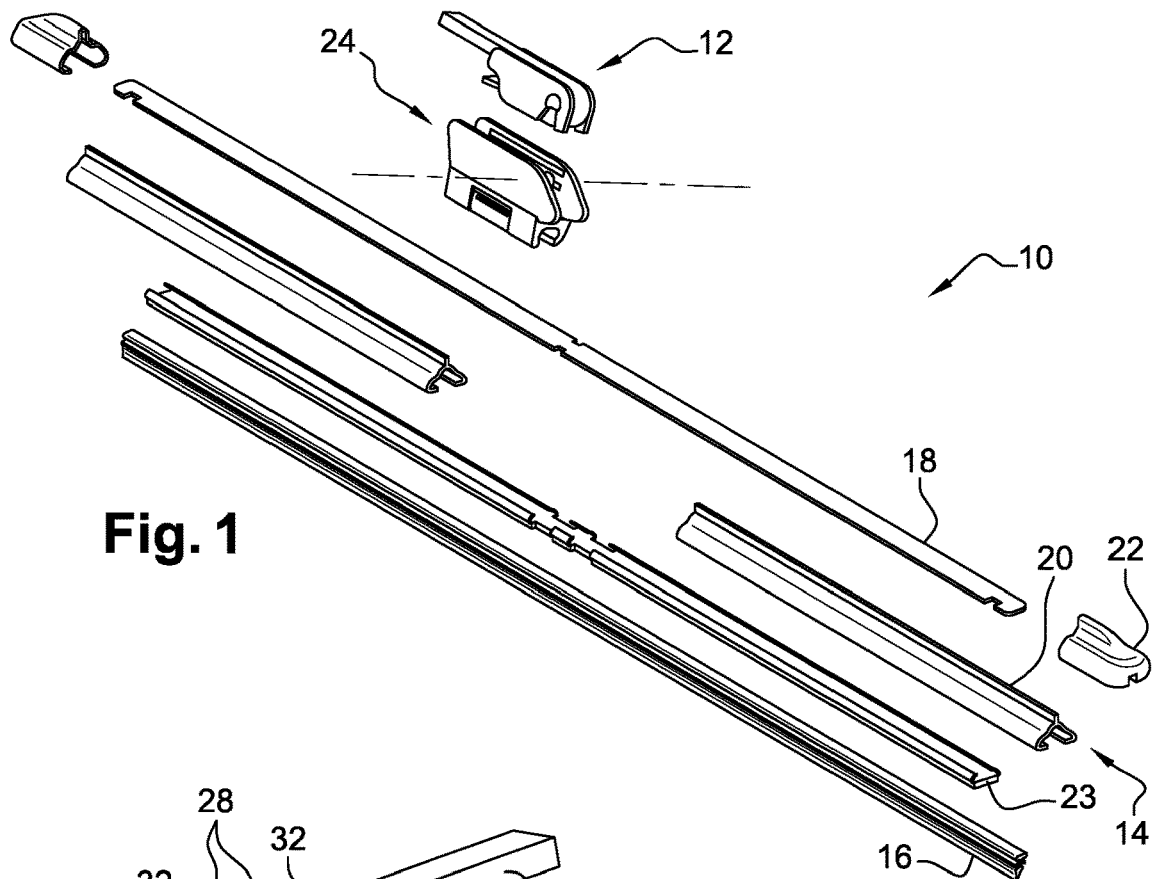

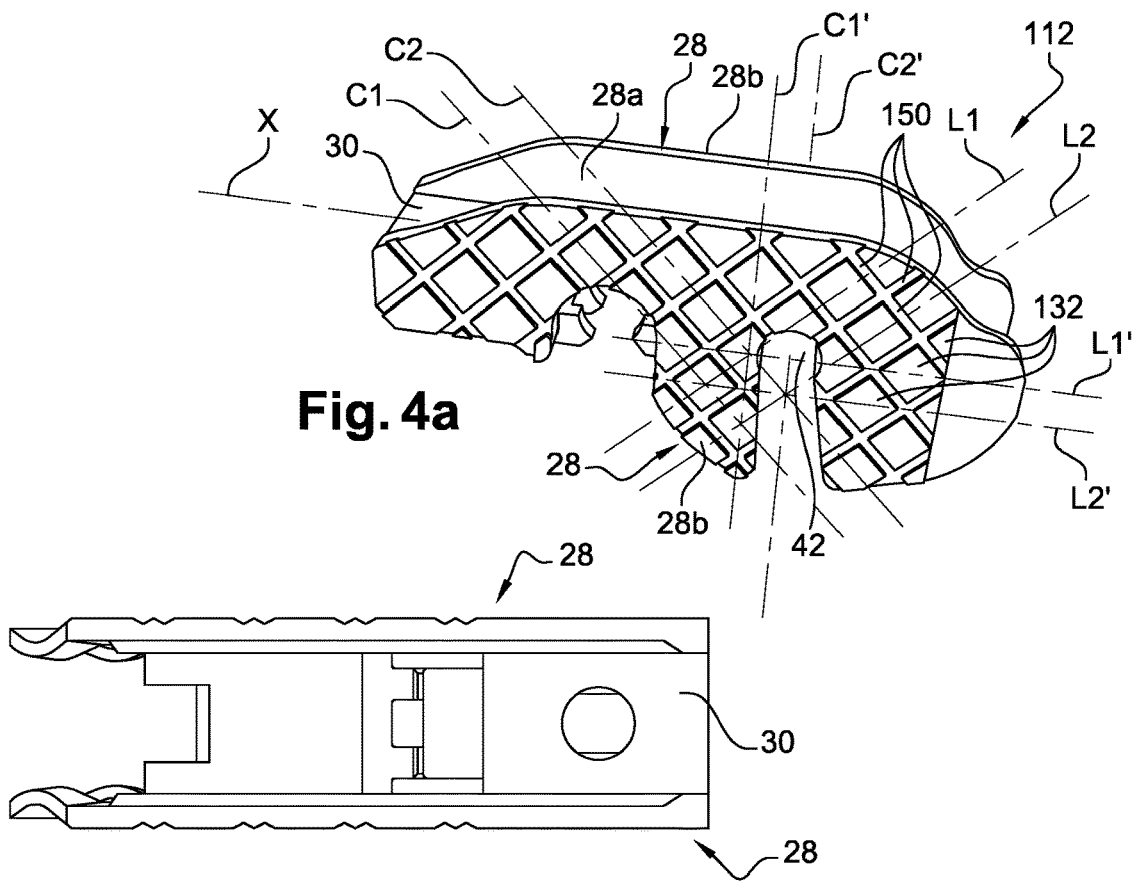
Fig. 4a
Fig. 4b
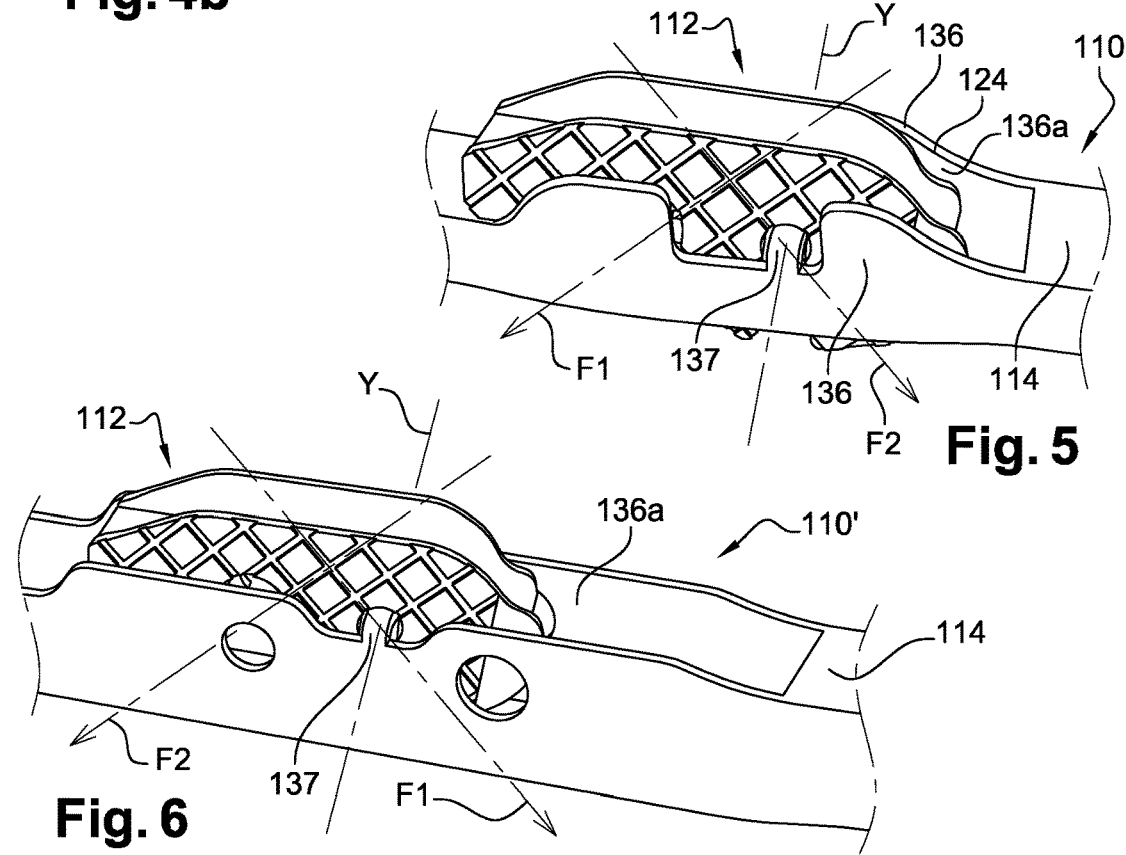
Fig. 5
Fig. 6

Fig. 7a  Fig. 7b  Fig. 7c

ADAPTER FOR CONNECTING A WIPER BLADE TO A DRIVE ARM

The present invention relates in particular to an adapter for connecting a wiper to a drive arm, particularly for a motor vehicle.

A motor vehicle is conventionally equipped with wipers to wipe the windshield and prevent the driver's view of his surroundings from being disturbed. These wipers generally comprise a drive arm, effecting an angular back-and-forth movement, and elongate wipers, which themselves bear blade rubbers made from an elastic material. These blades rub against the windshield and remove the water by conveying it out of the field of view of the driver. The wipers are produced in the form either, in a conventional version, of articulated yokes that hold the blade rubber at several discrete points along it, causing it to bow to allow it to conform to any potential curvature of the windshield or, in a more recent version referred to as «flat blade», of a semi rigid assembly which holds the blade rubber along its entire length by one or more tensioning strip(s) that allow(s) the wiper to be pressed against the windshield without the need to use yokes.

In both solutions, the wiper is attached to the driver arm by a connecting system comprising an adapter and a connector. The connector is a component which is attached to the wiper and which may be incorporated into the wiper. The connector is attached directly to the blade rubber or to the flat blade, whereas the adapter is secured to the arm. The adapter is an intermediate component that allows the connector to be connected and fixed to the drive arm. It is configured to collaborate with a head or end piece of the drive arm.

The connector and the adapter each comprise articulation means configured to collaborate with complementary means belonging to the other component, in order to define at least one transverse axis of pivoting of the connector with respect to the adapter, which is an axis of pivoting of the wiper with respect to the arm. In the current technology, one of the components, such as the connector, generally comprises a substantially cylindrical physical pivot which defines the axis of articulation and which is housed in a housing of complementary shape belonging to the other component.

In some cases, the adapter is mounted in a housing of the connector or of the wiper and comprises two substantially parallel walls some distance apart, joined together by at least one connecting element. The walls of the adapter comprise internal lateral faces between which this connecting element extends, and external lateral faces which are intended to be situated facing internal lateral faces of the housing belonging to the connector or to the arm, and to collaborate by sliding with these faces as the adapter pivots with respect to the connector or to the wiper.

In order for that, the external lateral faces of the walls of the adapter comprise projecting patterns which at their tips define bearing and guiding surfaces. In the current state of the art as illustrated by document FR-A1-2 957 877, the patterns are few in number and have an overall shape that is curved around the aforementioned axis of pivoting.

The invention proposes an improvement to this technology.

To this end, the invention proposes an adapter for connecting a wiper to a drive arm, the adapter comprising two substantially parallel walls joined together by at least one connecting element, said walls comprising internal first lateral faces between which said at least one connecting element extends, and external lateral faces comprising projecting sliding-guidance patterns, characterized in that said patterns are distributed in rows and columns.

The invention offers numerous advantages. It can be applied to an adapter of small size and the patterns, which can be more numerous because they are arranged in rows and columns, can have a thickness or thicknesses which is/are relatively small by comparison with the prior art. For given wall thicknesses, this means that the walls, and therefore the adapter in its entirety, can be stiffened. This is particularly advantageous because the stiffness of the adapter may have an influence on the precision with which the wiper can be controlled in operation. The distribution of the patterns also makes it possible to improve the guidance of the adapter by limiting the non-guided wall portions. The invention also makes it possible to maintain good drainage of water between the walls of the adapter and of the connector or of the wiper, as the projecting patterns delimit drainage channels between them. This makes it possible to avoid phenomena whereby the walls stick, particularly when their contacting surfaces are smooth and separated by a film of water. The invention allows better control over the thickness of the adapter. Finally, it allows optimum lateral guidance and an optimum transmission force between the adapter and the connector or the wiper.

For preference, said patterns are separated from one another by grooves that form drainage channels. In particular, the drainage channels are, over at least part of their length, inclined with respect to the longitudinal axis of the adapter.

Within the context of the invention, the expression «to be inclined with respect to the longitudinal axis of the adapter means being neither parallel nor perpendicular to said axis. In other words, the angle formed by the inclination with respect to the longitudinal axis is strictly comprised between 0° and 90°.

The adapter according to the invention may comprise one or more of the following features, considered in isolation from one another or in any combination with one another;
said patterns cover more than 50%, and preferably more than 80%, of said external lateral faces,
said patterns have identical geometric shapes,
at least some of said patterns form squares, circles, diamonds, triangles and/or polygons (for example of the honeycomb type),
the patterns all have the same thickness,
the adapter comprises, on each of said external lateral faces, first patterns of thickness E1 and second patterns of thickness E2 different than E1,
each of said external lateral faces comprises more than ten patterns,
said at least one connecting element defines a throat which is substantially perpendicular to said walls and which is configured to receive and guide a pivot about which said adapter rotates,
at least some of the rows and/or of the columns are straight,
at least some of the rows and/or of the columns are parallel,
at least some of the rows and/or columns are curved,
at least some of the rows are perpendicular to at least some of the columns,
said drainage channels form a grid pattern,
each of said grooves has a width comprised between 0.1 and 1 mm, and for example of the order of 0.5 mm, and
each of said grooves has a U-shaped or V-shaped cross section.

The present invention also relates to a wiper or a wiper arm, characterized in that it comprises or bears an adapter as described hereinabove.

Figure 2:
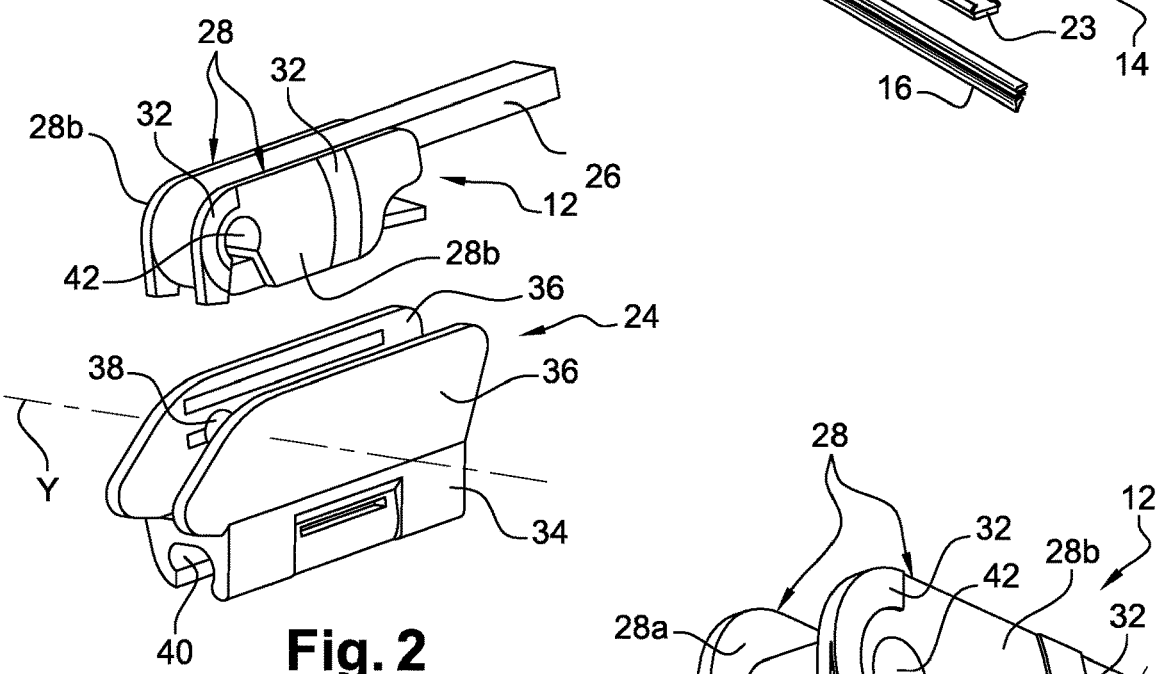
Figure 3:
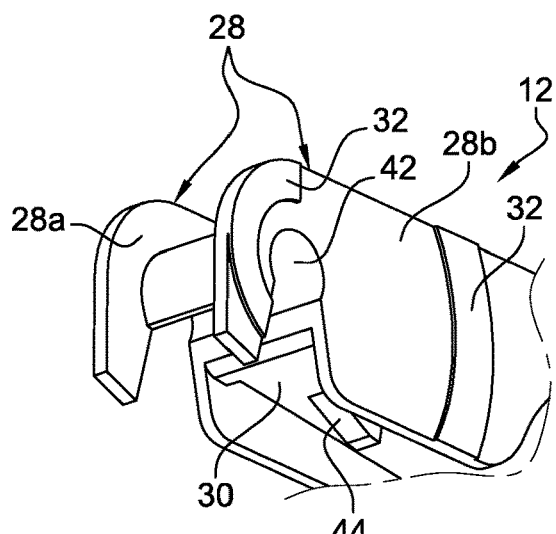
Figure 7D:
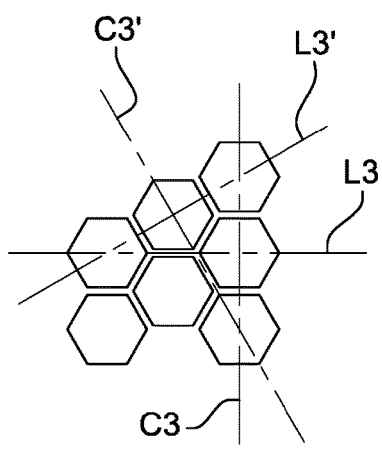
Figure 7D:
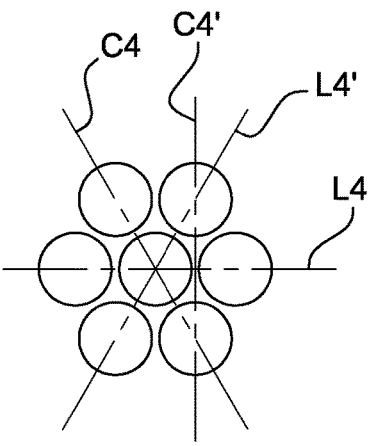
Figure 7D:
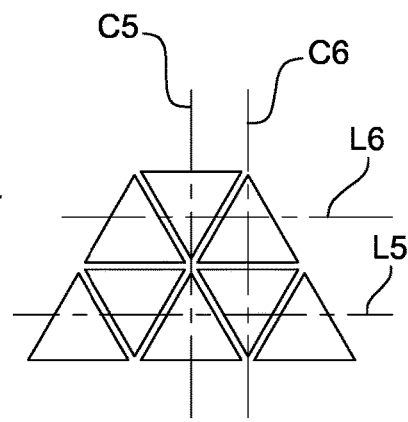
Figure 7D:
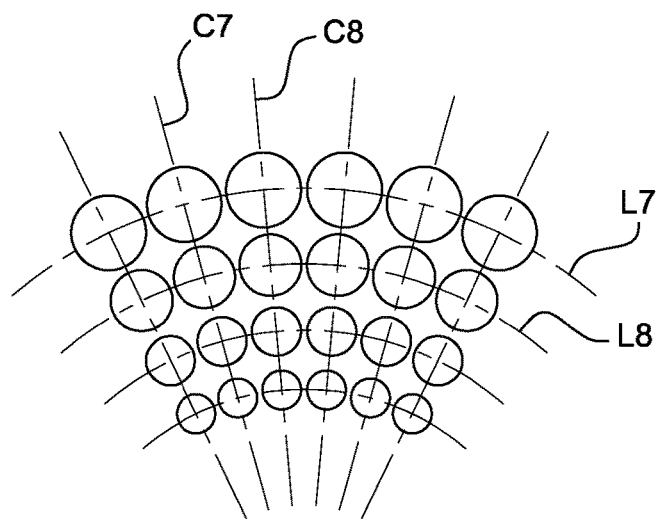
Figure 8:
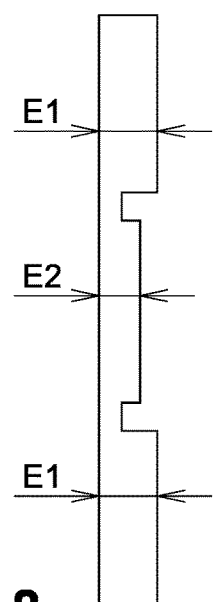

The invention will be better understood and further details, features and advantages of the invention will become apparent from reading the following description given by way of non-limiting example with reference to the attached drawings, in which:

FIG. 1 is a schematic view in exploded perspective of a wiper, this wiper being equipped with an adapter for connecting the wiper to a drive arm, FIG. 2 is a schematic perspective view of an adapter, of a connector and of one end of a drive arm, FIG. 3 is another schematic perspective view of the adapter of FIG. 2, FIGS. 4a and 4b are schematic perspective views of an adapter according to the invention, FIGS. 5 and 6 are schematic partial perspective views of wipers equipped with the adapter of FIGS. 4a and 4b, FIGS. 7a to 7d depict alternative forms of embodiment of the patterns of an adapter according to the invention, and FIG. 8 is a schematic view in cross section of a lateral wall of an adapter according to the invention and shows patterns of different thicknesses.

It should be noted that the figures set out the invention in detail so that the invention can be implemented, and that of course said figures may well serve to better define the invention if need be.

In the description which follows, the denominations longitudinal or lateral refer to the orientation of the wiper or of the drive arm. The longitudinal direction corresponds to the main axis of the wiper or of the arm along which it extends, whereas the lateral orientations correspond to straight lines which are concurrent, which means to say which cross the longitudinal direction, notably at right angles to the longitudinal axis of the wiper or of the arm in its plane of rotation. In the case of the longitudinal directions, the denominations outer (or rear) or inner (or front) are assessed in relation to the point of attachment of the wiper to the arm, the denomination inner corresponding to the part where the arm and a half-wiper extend, or with respect to the point of attachment of the arm to the vehicle. Finally, directions referenced as being upper or lower correspond to orientations perpendicular to the plane of rotation of the wiper, the denomination lower containing the plane of the windshield.

FIG. 1 illustrates a wiper 10 equipped with an adapter 12.

The wiper 10 is of the flat blade type in the example depicted and comprises a longitudinal body 14, a blade rubber 16, generally made of rubber, and at least one backing strip 18 which stiffens the blade and encourages it to press against a window such as a vehicle windshield.

The body 14 of the wiper 12 may comprise an upper aerodynamic deflector 20 intended to improve the operation of the wiping system, the purpose of this deflector being to improve the pressure with which the wiper is pressed against the windshield and, therefore, the aerodynamic performance of the wiper.

The wiper 10 may further comprise end pieces 22 or clips for attaching the blade 16 and the backing strip 18 to the body 14, these end pieces 22 being situated at each of the longitudinal ends of the body 14.

The wiper 10 also comprises an element 23 for attaching the blade 16, which element is housed in the body 14.

The wiper 10 comprises, substantially at its middle, a connector 24 which is intended to accept the adapter 12, the connector-adapter assembly forming a system connecting the wiper 10 to a drive arm (which is not depicted in FIG. 1).

The adapter 12 is mounted on the connector 24 in such a way as to maintain a degree of freedom to pivot about an axis of articulation Y which is a transverse axis substantially perpendicular to the longitudinal axis of the wiper 10. This degree of freedom allows the wiper 10 to pivot with respect to the arm and thus allows the wiper as it moves to follow the curvature of the windshield.

The arm 26, visible in FIG. 2, is intended to be driven by a motor to follow an angular back-and-forth movement allowing removal of the water and possibly other undesirable elements with which the windshield is covered. Its free end for connection to the adapter 12 forms a U-shaped hook in the opening of which the adapter 12 is intended to be mounted.

The adapter 12 comprises two parallel lateral walls 28 which are some distance apart and joined together by at least one transverse wall 30 (FIG. 3). The walls 28 comprise internal lateral faces 28a between which the transverse wall 30 extends, and external lateral faces 28b comprising projecting patterns 32.

The connector 24, best visible in FIG. 2, comprises a base 34 of substantially parallelepipedal shape, surmounted by two lateral walls 36 which extend in the upper continuation of the lateral faces of the base and which are intended to clamp the lateral walls 28 of the adapter once the latter is clipped into the connector 24.

The separation between the walls 36 of the connector 24 is therefore slightly greater than the separation between the external lateral faces 28b of the adapter. Between the two walls 36 there extends a transverse pivot 38 that defines the axis Y and about which the adapter 12 is intended to rotate within predefined angular limits. Finally, the lower part of the base 34 is cut with a groove 40 for mounting the rest of the wiper 10, particularly the fixing element 23.

FIG. 3 shows other details of the adapter 12 and, in particular, of the transverse wall 30 thereof. At its external end, the wall 30 continues longitudinally in the form of a throat 42 which is a half-cylinder of revolution intended to accept the transverse pivot 38 of the connector when the latter is clipped onto the adapter. In order to perform this clip-fastening, the opening of the throat 42 extends over slightly less than 180°, so that force needs to be exerted in order to cause the pivot 38 to enter the throat 42.

FIG. 3 also shows a stud 44 positioned on the transverse wall 30 and which, in collaboration with an orifice (not depicted) made in the U-shaped terminal part of the arm 26, allows the latter to be secured to the adapter 12.

The adapter 12 may be fitted as follows. It is inserted between the walls 36 of the connector 24 until the pivot 38 clips into the throat 42 of the adapter, then the arm 26 is fitted over the adapter in such a way that its terminal part closes off the opening of the throat 42 (FIG. 2) and prevents the adapter from becoming detached from the connector.

The projecting patterns 32 on the external faces 28b of the adapter 12 are intended to collaborate in sliding with the internal faces facing them of the walls 36 of the connector, so as to in particular guide the pivoting of the wiper 10 with respect to the arm 26 about the axis Y during operation.

According to the current state of the art as illustrated in FIGS. 1 to 3, these patterns 32 have an annular shape which is curved around the axis of pivoting Y.

The invention proposes an improvement to this technology and shows one embodiment of the adapter according to the invention in FIGS. 4a and 4b.

The adapter 112 in FIGS. 4a and 4b may comprise all the features of the adapter 12, described in the foregoing, and differs from this adapter in terms of the layout of the projecting patterns 132 on the external faces 28b of the lateral walls 28 thereof.

In the example depicted, the patterns 132 are distributed in rows and columns. The patterns 132 here have identical geometric shapes which here are squares or diamonds. The rows of patterns are straight and parallel and the columns of patterns are also straight and parallel.

If the patterns 132 are considered to be squares, the rows L1, L2, etc. of patterns are inclined with respect to the axis of elongation X of the adapter. The columns C1, C2, etc. of patterns are inclined with respect to this axis X.

If, on the other hand, the patterns 132 are considered to be diamonds, the rows L1', L2', etc. of patterns are parallel to the axis of elongation X of the adapter, and the columns of patterns C1, C2, etc., are perpendicular to this axis X.

The patterns 132 project from the external faces 28b of the walls 28 of the adapter 112 and at their tips have substantially planar surfaces intended to collaborate in sliding with a connector, as explained in the foregoing.

The patterns 132 are separated from one another by grooves which form drainage channels 150. These channels are intended to facilitate the flow of water in particular between the adapter and the connector during operation, so as to limit the effect that the water has on the aforementioned guidance. The drainage channels which are inclined with respect to the longitudinal axis of the adapter. In other words, they make an angle strictly comprised between 0° and 90° with the longitudinal axis of the adapter.

The width of each groove needs to be enough to allow the water or even mud to flow without storing an abnormal amount of dust, snow, salt or ice. This width is comprised between 0.1 and 1 mm, and is, for example 0.5 mm. This width may vary across the one external face.

In the example depicted, the channels 150 form a network or grid pattern. As can be seen in FIG. 4b, the channels 150 are substantially V-shaped in cross section. As an alternative, they could have some other cross section, such as U-shaped section.

The patterns 132 are present here across the entirety of the external faces 28b of the adapter 112, except for the regions of the lateral walls 28 on which slots, cutouts, or indentations are formed.

The adapter 112 may be mounted in a connector 24 of the kind described in the foregoing and depicted in FIGS. 1 to 3. As an alternative and as depicted in FIGS. 5 and 6, the connector 124 may be integrated and formed as one piece with a part of the wiper 110, 110', such as the body thereof. FIGS. 5 and 6 show that the adapter 112 of FIGS. 4a and 4b can be mounted in two different wipers 110, 110', respectively.

The body 114 of each of the wipers 110, 110' comprises, substantially at its middle, two lateral walls 136 spaced apart and defining a space in which to house the adapter 112. The walls 136 comprise on their upper edges tabs 137 facing toward one another and defining the axis Y of pivoting of the wiper with respect to the adapter, and therefore of the wiper with respect to the arm.

The external faces 28b of the adapter 112 face internal faces 136a of the walls 136 of the wiper and the patterns 132 collaborate in sliding with these internal faces in order to guide the pivoting of the wiper about the axis Y. The arrows F1, F2 indicate the direction in which the water, rain for example, flows between the faces 28b, 136a in the aforementioned channels 150 when the wiper is in operation.

FIGS. 7a to 7d are alternative forms of embodiment of the patterns 132.

In FIG. 7a, the patterns are polygons and, more specifically, hexagons. They are distributed in rows and columns. Straight lines L3 parallel to the axis of elongation of the adapter or straight lines L3' which are inclined with respect to this axis may be considered. The same reasoning applies to the columns C3, C3'.

In FIG. 7b, the patterns are circles. They are distributed in rows and columns. As in the previous case, rows L4 or L4' and columns C4 or C4' can be considered.

In FIG. 7c, the patterns are triangles some of which are arranged in such a way that their vertices point downward, and others of which are arranged in such a way that their vertices point upward. They are distributed in rows L5, L6 and columns C5, C6.

In FIG. 7d, the patterns are circles, the dimensions (diameter) of which vary from one row L7 to another L8. These rows are not straight but rather curved about a common center D. The columns C7, C8 are straight and extend substantially radially with respect to this center D.

FIG. 7d thus shows that the projecting patterns do not necessarily all have to have the same dimensions, particularly the same diameter in the case of circles.

FIG. 8 shows that the patterns may also differ in terms of their thickness. The patterns of one and the same row or column may have a thickness E1 that is different from that E2 of patterns of an adjacent row or column. The patterns of the one same row or column may have different thicknesses E1, E2. These thicknesses may be measured from the bottom of the grooves that form the drainage channels 150.

In the various examples illustrated, the projecting patterns are separated from one another by grooves that form drainage channels which are, over at least part of their length, inclined with respect to the longitudinal axis of the adapter. These channels, whatever the geometry of the patterns, facilitate the desired guidance by improving the flow of water between the adapter and the connector.

The invention claimed is:

1. An adapter for connecting a wiper to a drive arm, the adapter comprising:
   two substantially parallel walls joined together by at least one connecting element, said parallel walls comprising internal first lateral faces between which said at least one connecting element extends, and external lateral faces comprising projecting sliding-guidance patterns,
   wherein said projecting sliding-guidance patterns are distributed in rows and columns, and are separated from one another by grooves that form drainage channels which are, over at least part of their length, inclined with respect to a longitudinal axis of the adapter,
   wherein an angle formed by the inclined grooves with respect to the longitudinal axis is strictly comprised between 0° and 90°,
   wherein the longitudinal axis of the adapter is parallel to a top surface of the at least one connecting element,
   wherein at least some of said patterns form squares, circles, diamonds, triangles and/or polygons.

2. The adapter as claimed in claim 1, in which said patterns cover more than 80% of said external lateral faces.

3. The adapter as claimed in claim 1, in which said patterns have identical geometric shapes.

4. The adapter as claimed in claim 1, in which said patterns all have the same thickness.

5. The adapter as claimed in claim 1, comprising on each of said external lateral faces, first patterns of thickness E1 and second patterns of thickness E2 different than E1.

6. The adapter as claimed in claim 1, in which each of said external lateral faces comprises more than ten patterns.

7. The adapter as claimed in claim 1, in which said at least one connecting element defines a throat which is substantially perpendicular to said walls and which is configured to receive and guide a pivot about which said adapter rotates.

8. The adapter as claimed in claim 7, wherein the external lateral faces of the adapter face internal second faces of walls of a connector which fastens to the adapter, and the patterns collaborate in sliding with the internal second faces in order to guide pivoting of the wiper about an axis of articulation.

9. The adapter as claimed in claim 8, wherein the throat is a half-cylinder of revolution configured to accept the pivot of the connector when the connector is clip-fastened onto the adapter.

10. The adapter as claimed in claim 9, wherein to perform the clip-fastening, the opening of the throat extends over slightly less than 180°, so that force is exerted to cause the pivot to enter the throat.

11. The adapter as claimed in claim 1, in which said drainage channels form a grid pattern.

12. The adapter as claimed in claim 1, in which each of said grooves has a width comprised between 0.1 and 1 mm.

13. The adapter as claimed in claim 1, in which each of said grooves has a U-shaped or V-shaped cross section.

14. A wiper comprising an adapter as claimed in claim 1.

15. A wiper arm comprising an adapter as claimed in claim 1.

* * * * *